US010610073B1

(12) United States Patent
Lucas

(10) Patent No.: US 10,610,073 B1
(45) Date of Patent: Apr. 7, 2020

(54) HOUSEKEEPING CART DRAWER WITH A BATTERY-POWERED CHARGING DOCK FOR STORING, CHARGING, TRANSPORTING, AND DEPLOYING A ROBOTIC VACUUM

(71) Applicant: Bradley Joseph Lucas, Carlsbad, CA (US)

(72) Inventor: Bradley Joseph Lucas, Carlsbad, CA (US)

( * ) Notice: Subject to any disclaimer, the term of this patent is extended or adjusted under 35 U.S.C. 154(b) by 0 days.

(21) Appl. No.: 16/655,660

(22) Filed: Oct. 17, 2019

Related U.S. Application Data

(60) Provisional application No. 62/800,989, filed on Feb. 4, 2019.

(51) Int. Cl.
*A47L 9/00* (2006.01)
*B62B 3/00* (2006.01)
*B62B 3/10* (2006.01)

(52) U.S. Cl.
CPC ............ *A47L 9/0063* (2013.01); *B62B 3/004* (2013.01); *B62B 3/005* (2013.01); *B62B 3/104* (2013.01); *A47L 2201/022* (2013.01)

(58) Field of Classification Search
CPC ...... A47L 9/0063; A47L 9/0009; A47L 9/009; A47L 2201/02; A47L 2201/022; B62B 3/005; B62B 3/10; A47B 88/40; A47B 88/453; A47B 88/46
See application file for complete search history.

(56) References Cited

U.S. PATENT DOCUMENTS

| D474,570 S    * | 5/2003  | Presnell    ..................... D34/17 |
| 8,944,444 B1  * | 2/2015  | Tvrdy    ..................... B62B 3/005 |
|                 |         | 280/47.35 |
| 10,398,270 B2 * | 9/2019  | Jonsson    ............... A47L 9/0063 |
| 2010/0017998 A1*| 1/2010  | McCambridge    ........ A47L 5/362 |
|                 |         | 15/347 |

(Continued)

FOREIGN PATENT DOCUMENTS

| DE | 9301641 U1  * | 3/1993  | ............ B62B 3/005 |
| EP | 3181012 A1  * | 6/2017  | ........... A47B 88/443 |

*Primary Examiner* — Daniel J Rohrhoff
(74) *Attorney, Agent, or Firm* — Plager Schack LLP; Mark H. Plager; Stephen Hallberg

(57) ABSTRACT

A housekeeping cart drawer and battery-powered charging dock for storing, charging, transporting, and deploying a robotic vacuum is disclosed. The housekeeping cart drawer and battery-powered charging dock for storing, charging, transporting, and deploying a robotic vacuum includes a deployable ramp enabling a robotic vacuum to enter and exit the trolley. The robotic vacuum ingress/egress ramp may be deployed and retracted by a foot pedal, a mechanical hand lever, or electronically. The mobile maid trolley includes an internal docking station with battery to recharge batteries of the robotic vacuum and a connection to a dust bin whereby the robotic vacuum can empty the contents of its recovery bin into a larger dust bin inside the trolley, which can be cleaned by sliding a container out the bottom. The trolley enables the robotic vacuum to have increased power from larger batteries, be fully charged all day, and removes the need for a person or staff to bend down to deploy and pick up the robot on the floor of a room.

10 Claims, 4 Drawing Sheets

(56) References Cited

U.S. PATENT DOCUMENTS

| | | | |
|---|---|---|---|
| 2010/0066045 A1* | 3/2010 | Presnell | B62B 1/12 |
| | | | 280/47.18 |
| 2018/0029809 A1* | 2/2018 | Lee | A47L 5/22 |
| 2018/0228121 A1* | 8/2018 | Murray | A01K 1/0035 |
| 2019/0039637 A1* | 2/2019 | Thuma | B62B 5/0006 |
| 2019/0084602 A1* | 3/2019 | Ribbe | B62B 3/04 |
| 2019/0270466 A1* | 9/2019 | Flow | B62B 3/10 |
| 2019/0357747 A1* | 11/2019 | Keiler, III | H02J 7/0042 |

\* cited by examiner

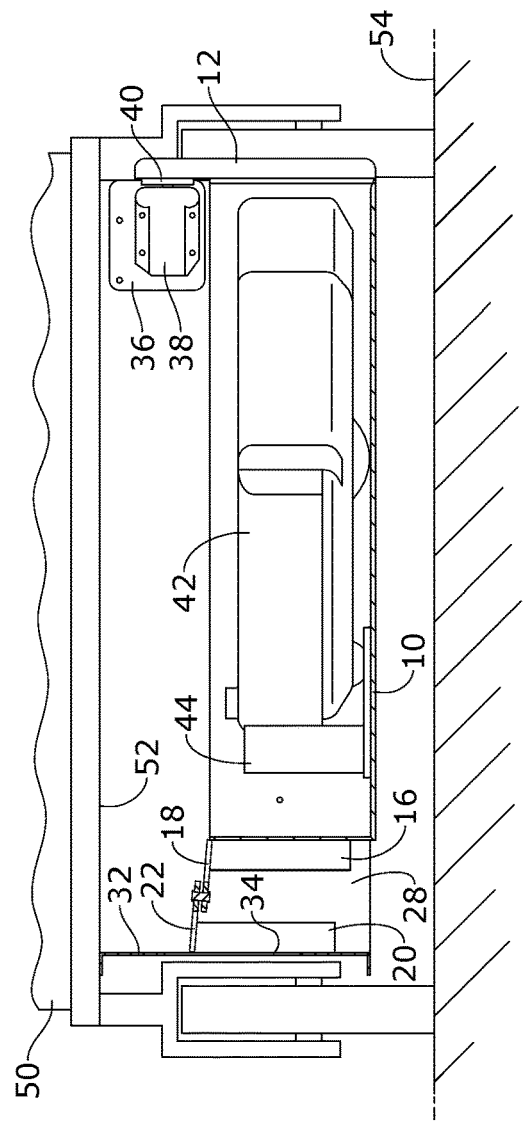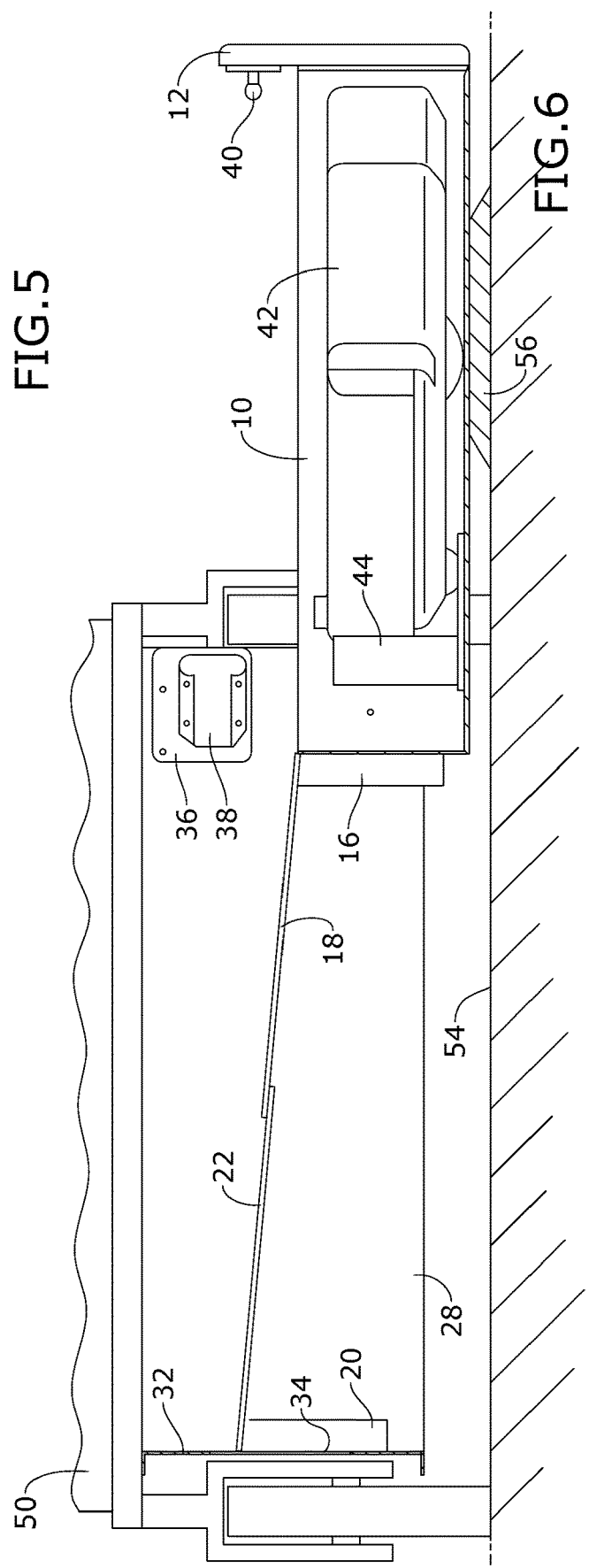

US 10,610,073 B1

HOUSEKEEPING CART DRAWER WITH A BATTERY-POWERED CHARGING DOCK FOR STORING, CHARGING, TRANSPORTING, AND DEPLOYING A ROBOTIC VACUUM

CLAIM OF BENEFIT TO PRIOR APPLICATION

This application claims benefit to U.S. Provisional Patent Application 62/800,989, entitled "MOBILE MAID TROLLEY WITH ROBOTIC VACUUM INGRESS/EGRESS RAMP AND BATTERY CHARGING DOCKING STATION," filed Feb. 4, 2019. The U.S. Provisional Patent Application 62/800,989 is incorporated herein by reference.

BACKGROUND

Embodiments of the invention described in this specification relate generally to housekeeping cart storage drawers, and more particularly, to a housekeeping cart drawer with a battery-powered charging dock for storing, charging, transporting, and deploying a robotic vacuum.

Commercial robotic vacuums are designed to ease the work a person has to do in cleaning a room or in cleaning several rooms. The existing robotic vacuums are commonly used in homes, but usage of robotic vacuums in other areas or for commercial/industrial deployments is limited due to several existing issues. For instance, existing robotic vacuums cannot be used to clean hotel rooms because they rapidly loose their charge, cannot be easily deployed by maids or other cleaning personnel without dropping them or causing repetitive motion-based back strain or injury, and they do not have enough power to provide enough suction sufficient for cleaning carpets commonly used in public establishments, such as hotels, inns, etc. Addressing their power limitations with bigger batteries only worsens the problem for maids and other housekeeping cleaning personnel who suffer muscle strain from increased weight of the bigger batteries and repetitive motion injuries from repeatedly bending over to pick up or deploy robotic vacuums with the bigger batteries.

Thus, hotel maids and other housekeeping cleaning personnel have no present way of effectively deploying and transporting a robotic vacuum without repeatedly bending down and without the robotic vacuum losing power due to increased suction requirements that quickly drain the robotic vacuum batteries of power. Also, when finished with a clean-up routine, robotic vacuums are configured to automatically return to a stationary home/charging base making it difficult to deploy the robot in different non-adjacent rooms unless the stationary/home/charging base is repetitively picked up, carried, and plugged into the wall socket of each room to be cleaned because the only way to deploy robotic vacuums in non-adjacent rooms currently is to manually pick them up and carry them.

Therefore, what is needed is a way to provide a robotic vacuum with increased power from larger batteries and which enables the robotic vacuum to return automatically for charging so that housekeeping and cleaning personnel are not required to bend down to pick up and carry the robotic vacuum and not required use a power outlet in each room to be cleaned and be forced to repetitiously bend over, carry, relocate, plug in, and unplug a charging port for the robotic vacuum in each room.

BRIEF DESCRIPTION

A novel housekeeping cart drawer with a battery-powered charging dock for storing, charging, transporting, and deploying a robotic vacuum is disclosed. In some embodiments, the housekeeping cart drawer and battery-powered charging dock enables a human user to easily deploy the robotic vacuum from an upright standing position and allows the robotic vacuum to return automatically to the battery-powered charging dock in the housekeeping cart drawer. In this way, the human user, such as a hotel maid or other housekeeping personnel, does not need to bend down and the battery-powered charging dock does not need to be carried, plugged in, and unplugged each time it is used.

In some embodiments, the housekeeping cart drawer includes a battery-powered charging dock. In some embodiments, the battery-powered charging dock charges the robotic vacuum when the robotic vacuum is connected to the charging dock in the housekeeping cart drawer. In some embodiments, the housekeeping cart drawer fits within a housekeeping cart drawer frame. In some embodiments, a pair of pivot arms extend the housekeeping cart drawer out of the housekeeping cart drawer frame to a threshold surface for deploying the robotic vacuum. In some embodiments, the pair of pivot arms retract the housekeeping cart drawer back into the housekeeping cart drawer frame from the threshold surface after deployment of the robotic vacuum.

In some other embodiments, the housekeeping cart drawer includes the battery-powered charging dock and a ramp for deploying the robotic vacuum. In some embodiments, the ramp provides an alternative to extending the housekeeping cart drawer out of the housekeeping cart drawer frame for deploying the robotic vacuum. In some embodiments, the ramp is utilized to deploy the robotic vacuum when there is a gap between the threshold surface and the fully extended housekeeping cart drawer. In some other embodiments, the housekeeping cart drawer further includes a connection to a dust bin to enable the robotic vacuum to empty waste (dust and debris) from a recovery bin of the robotic vacuum into a larger dust bin inside the housekeeping cart. In some embodiments, the housekeeping cart drawer includes a wireless communication device to receive a signal from a corresponding wireless communication device of the robotic vacuum which signals when to prepare the housekeeping cart drawer for ingress of the robotic vacuum. In some embodiments, the housekeeping cart drawer prepares for ingress of the robotic vacuum by electronic extension of the pair of pivot arms and lowering of the housekeeping cart drawer to the threshold surface when the wireless communication device of the housekeeping cart drawer receives the signal from the corresponding wireless communication device of the robotic vacuum. In some embodiments, the housekeeping cart drawer additionally prepares for ingress of the robotic vacuum by electronic deployment of the ramp down to the threshold surface there is a gap between the housekeeping cart drawer and the threshold surface. In some embodiments, the wireless communication type used by the wireless communication device and the corresponding wireless communication device is Bluetooth.

In some embodiments, the housekeeping cart drawer is a stationary housekeeping cart drawer box that is fixed in the housekeeping cart drawer frame with no pivot arms for extension and retraction of the stationary housekeeping cart drawer box. In some embodiments, the ramp of the stationary housekeeping cart drawer box is configured to allow for robotic vacuum ingress into the stationary housekeeping cart drawer box and robotic vacuum egress out of the stationary housekeeping cart drawer box. In some embodiments, the ramp of the stationary housekeeping cart drawer box is deployed and retracted by one of a foot pedal, a mechanical hand lever, and an electronic ramp. In some embodiments, the ramp includes a wireless communication device to receive a signal from a corresponding wireless communication device of the robotic vacuum which signals when to electronically retract the ramp. In some embodiments, the wireless communication type used by the wireless communication device and the corresponding wireless communication device is Bluetooth. In some embodiments, the stationary housekeeping cart drawer box includes an internal docking station with battery to recharge the robotic vacuum and a connection to a dust bin to enable the robotic vacuum to empty waste (dust and debris) from its recovery bin into a larger dust bin inside the housekeeping cart. In some embodiments, the larger dust bin inside the housekeeping cart can be cleaned by sliding a container out from the bottom of the stationary housekeeping cart drawer box.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 5 conceptually illustrates a section view of a housekeeping cart drawer in some embodiments taken along line 5-5 in FIG. 1.

FIG. 6 conceptually illustrates a section view of a housekeeping cart drawer in some embodiments at full extension and lowered to a threshold surface for deployment of the robotic vacuum.

DETAILED DESCRIPTION

Figure 1:
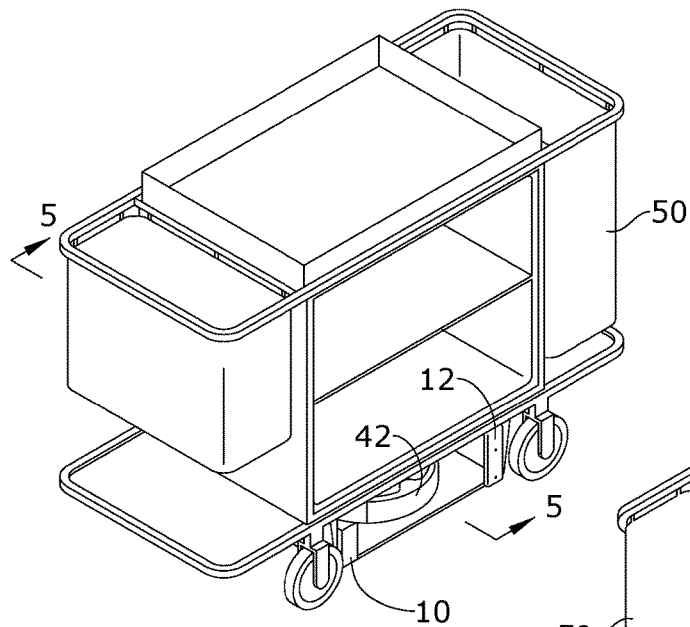
FIG. 1 conceptually illustrates a top perspective view of a movable housekeeping cart with a housekeeping cart drawer in some embodiments installed for storing, charging, transporting, and deploying a robotic vacuum.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel housekeeping cart drawer for storing, charging, transporting, and deploying a robotic vacuum. In some embodiments, the housekeeping cart drawer includes a battery-powered charging dock. In some embodiments, the battery-powered charging dock charges the robotic vacuum when the robotic vacuum is connected to the charging dock in the housekeeping cart drawer. In some embodiments, the housekeeping cart drawer fits within a housekeeping cart drawer frame. In some embodiments, a pair of pivot arms extend the housekeeping cart drawer out of the housekeeping cart drawer frame to a threshold surface for deploying the robotic vacuum. In some embodiments, the pair of pivot arms retract the housekeeping cart drawer back into the housekeeping cart drawer frame from the threshold surface after deployment of the robotic vacuum.

In some other embodiments, the housekeeping cart drawer includes the battery-powered charging dock and a ramp for deploying the robotic vacuum. In some embodiments, the ramp provides an alternative to extending the housekeeping cart drawer out of the housekeeping cart drawer frame for deploying the robotic vacuum. In some embodiments, the ramp is utilized to deploy the robotic vacuum when there is a gap between the threshold surface and the fully extended housekeeping cart drawer. In some other embodiments, the housekeeping cart drawer further includes a connection to a dust bin to enable the robotic vacuum to empty waste (dust and debris) from a recovery bin of the robotic vacuum into a larger dust bin inside the housekeeping cart. In some embodiments, the housekeeping cart drawer includes a wireless communication device to receive a signal from a corresponding wireless communication device of the robotic vacuum which signals when to prepare the housekeeping cart drawer for ingress of the robotic vacuum. In some embodiments, the housekeeping cart drawer prepares for ingress of the robotic vacuum by electronic extension of the pair of pivot arms and lowering of the housekeeping cart drawer to the threshold surface when the wireless communication device of the housekeeping cart drawer receives the signal from the corresponding wireless communication device of the robotic vacuum. In some embodiments, the housekeeping cart drawer additionally prepares for ingress of the robotic vacuum by electronic deployment of the ramp down to the threshold surface there is a gap between the housekeeping cart drawer and the threshold surface. In some embodiments, the wireless communication type used by the wireless communication device and the corresponding wireless communication device is Bluetooth.

In some embodiments, the housekeeping cart drawer is a stationary housekeeping cart drawer box that is fixed in the housekeeping cart drawer frame with no pivot arms for extension and retraction of the stationary housekeeping cart drawer box. In some embodiments, the ramp of the stationary housekeeping cart drawer box is configured to allow for robotic vacuum ingress into the stationary housekeeping cart drawer box and robotic vacuum egress out of the stationary housekeeping cart drawer box. In some embodiments, the ramp of the stationary housekeeping cart drawer box is deployed and retracted by one of a foot pedal, a mechanical hand lever, and an electronic ramp. In some embodiments, the ramp includes a wireless communication device to receive a signal from a corresponding wireless communication device of the robotic vacuum which signals when to electronically retract the ramp. In some embodiments, the wireless communication type used by the wireless communication device and the corresponding wireless communication device is Bluetooth. In some embodiments, the stationary housekeeping cart drawer box includes an internal docking station with battery to recharge the robotic vacuum and a connection to a dust bin to enable the robotic vacuum to empty waste (dust and debris) from its recovery bin into a larger dust bin inside the housekeeping cart. In some embodiments, the larger dust bin inside the housekeeping cart can be cleaned by sliding a container out from the bottom of the stationary housekeeping cart drawer box.

The housekeeping cart drawer and battery-powered charging dock for storing, charging, transporting, and deploying a robotic vacuum of the present disclosure may be comprised of the following elements. This list of possible constituent elements is intended to be exemplary only and it is not intended that this list be used to limit the housekeeping cart drawer and battery-powered charging dock for storing, charging, transporting, and deploying a robotic vacuum of the present application to just these elements. Persons having ordinary skill in the art relevant to the present disclosure may understand there to be equivalent elements that may be substituted within the present disclosure without changing the essential function or operation of the housekeeping cart drawer and battery-powered charging dock for storing, charging, transporting, and deploying a robotic vacuum.

1. A mounting shelf (also referred to as a "housekeeping cart drawer frame") that attaches to the bottom of a housekeeping cart by way of drawer mounting holes. The drawer mounting holes would be configured to allow attachment to different brands of housekeeping carts. For example, some designs are based on attachment to a Suncast brand housekeeping cart, but the width and the length can be expanded for other brands of housekeeping carts. For instance, the width can be expanded to 24" and the length can be expanded to 20" to mount to a Rubbermaid brand housekeeping cart.

2. An inside drawer (also referred to as a "housekeeping cart drawer" and a "housekeeping cart drawer box") that is attached to the mounting shelf at an angle that allows the drawer to lay flat on the floor and to extend over a room door threshold.

3. The inside drawer uses a two-part linkage mechanism in connection with the mounting shelf. The two-part linkage mechanism of some embodiments includes a pair of pivot arms to extend and retract the drawer. Some embodiments also include slide rails (also referred to as "slides") along the side panels/walls of the mounting shelf and which the inside drawer connects for angled extension and retraction. The angled extension follows an angle of extension and the angle of retraction follows an angle of retraction, which is the inverse of the angle of extension, thereby allowing the inside drawer to maintain the proper angle during extension or retraction.

4. A kick plate is at the front of the inside drawer (housekeeping cart drawer) to latch and unlatch the inside drawer (housekeeping cart drawer) with respect to the mounting shelf (housekeeping cart drawer frame) in connection with extension and retraction of the inside drawer (housekeeping cart drawer).

5. A latch comprising a latch post, a latch receiver, and a latch mounting block. The latch enables the inside drawer (housekeeping cart drawer) to be closed when not in use or during transport, such as when the housekeeping cart is being wheeled from room to room. Specifically, the latch post is secured to the inside drawer (housekeeping cart drawer) and connects to the latch receiver to secure the inside drawer (housekeeping cart drawer) to the mounting shelf (housekeeping cart drawer frame). The latch receiver is secured to the latch mounting block, which itself is attached to the mounting shelf (housekeeping cart drawer frame). The latch receiver is disposed on the latch mounting block and securely connects (holds) the latch post when the insider drawer (housekeeping cart drawer) is fully retracted into the mounting shelf (housekeeping cart drawer frame) which is tucked under the housekeeping cart.

6. A latch button releases the latch post from the latch receiver by a push of the kick plate when the latch post and latch receiver are in connection and at the onset of extension of the inside drawer (housekeeping cart drawer). The latch button secures the latch post to the latch receiver by a push of the kick plate when the latch post and the latch receiver are coming into connection during retraction of the insider drawer (housekeeping cart drawer).

7. Reference points for drawer slides make the drawer deploy at an angle to make the drawer flat on the floor.

The housekeeping cart drawer and battery-powered charging dock for storing, charging, transporting, and deploying a robotic vacuum of the present disclosure generally works by a hotel maid or other housekeeper rolling the housekeeping cart to the front of a room and positioning the cart directly in front of the doorway. A robotic vacuum and its charging/home station (also referred to as "charging dock" or "battery-powered charging dock") sit flat on the deployment shelf tucked under the housekeeping cart a few inches elevated from the floor. All the while the charging dock is plugged into a portable power bank residing on a different shelf above. The portable power bank may include one or more batteries that provide sufficient power to the charging dock to charge and repeatedly recharge the robotic vacuum batteries over an extended period of time, such as an 8 hour period, a full 24 hour period, or some other extended period of time. When the housekeeping cart is stopped in front of the doorway, the hotel maid or housekeeper can deploy the robotic vacuum by pushing in the kick plate with a tap of the foot. Pushing the kick plate causes the drawer to extend out over the room door threshold and downward onto the floor. With the charging dock now flat on the shelf of the drawer at floor level, the robotic vacuum can enter the room to clean. When finished, the robotic vacuum finds its way to the charging dock easily because the shelf of the drawer is flat on the floor, thereby ensuring that the robotic vacuum can easily navigate back to its beacon location for the charging dock positioned on the shelf of the drawer. With the robotic vacuum back in the charging dock, the hotel maid or housekeeping personnel presses the kick plate with their foot and pushes the drawer back under the housekeeping cart, again with their foot. Like the angle of extension when the drawer moves out from the housekeeping cart and is lowered to the floor, the angle of retraction for the drawer is already established such that the shelf of the drawer, complete with the robotic vacuum and the charging port, can be lifted back off the floor and tucked under the housekeeping cart. In some embodiments, the housekeeping cart drawer includes drawer slides that work in connection with the pair of pivot arms, providing support and maintaining angle accuracy throughout extension and retraction of the housekeeping cart drawer. In some embodiments, the drawer slides are extendable and connected to the housekeeping cart drawer and the housekeeping cart drawer frame. In some embodiments, the drawer slides extend outward along the angle of extension when the pair of pivot arms push the drawer out to full extension. In some embodiments, the drawer slides retract inward along the angle of retraction when the pair of pivot arms are compressed by inward force applied to the kick plate to push the housekeeping cart drawer into the housekeeping cart drawer frame under the housekeeping cart. In some embodiments, the drawer slides provide support for the housekeeping cart drawer and ensure the housekeeping cart drawer retracts back into the housekeeping cart drawer frame along the angle of retraction. When the robotic vacuum and the charging port (aka charging dock) are placed in their positions of the inside drawer (aka housekeeping cart drawer) and the inside drawer (aka housekeeping cart drawer) is fully retracted into the mounting shelf (aka housekeeping cart drawer frame) and tucked under the housekeeping cart, then the charging dock will be drawing charge from the large battery or power bank to charge and the robotic vacuum. And while charging of the robotic vacuum is happening, the housekeeping cart may be set in a stationary position or, alternatively, the charging dock, the robotic vacuum, and the power bank (aka large battery) may be transported with the housekeeping cart to the next room or any other location.

To use the housekeeping cart drawer and battery-powered charging dock for storing, charging, transporting, and deploying a robotic vacuum of the present disclosure, one may attach it to the bottom of a housekeeping cart. Alternatively, instead of using the housing keeping cart and battery-powered charging dock in connection with a housekeeping cart, one may instead use a janitor cart or another type of cart that is used in connection with cleaning multiple separate, non-adjacent rooms or in connection with cleaning in location where limited wall power outlets are available (e.g., for outside deployments).

Several more detailed embodiments are described in the sections below. Section I describes a housekeeping cart drawer that extends out of and retracts into a housekeeping cart for deploying and storing a robotic vacuum and includes a battery-powered charging dock for charging the robotic vacuum while stored in the housekeeping cart drawer. Section II describes a ramp-equipped non-stationary housekeeping cart drawer that extends from and retracts into the housekeeping cart and optionally deploys a ramp for ingress/egress of the robotic vacuum when a gap exists between a threshold surface and the housekeeping cart drawer when extended and lowered. Section III describes a stationary housekeeping cart drawer box that is fixed in a housekeeping cart drawer frame and includes a battery-powered charging dock for charging the robotic vacuum while stored in the stationary housekeeping cart drawer box and an ingress/egress ramp that allows the robotic vacuum to be deployed for cleaning and return for charging in the stationary housekeeping cart drawer box.

I. Housekeeping Cart Drawer and Battery-Powered Charging Dock

In some embodiments, the housekeeping cart drawer includes a battery-powered charging dock. In some embodiments, the battery-powered charging dock charges the robotic vacuum when the robotic vacuum is connected to the charging dock in the housekeeping cart drawer. In some embodiments, the housekeeping cart drawer fits within a housekeeping cart drawer frame. In some embodiments, a pair of pivot arms extend the housekeeping cart drawer out of the housekeeping cart drawer frame to a threshold surface for deploying the robotic vacuum. In some embodiments, the pair of pivot arms retract the housekeeping cart drawer back into the housekeeping cart drawer frame from the threshold surface after deployment of the robotic vacuum.

In some embodiments, the housekeeping cart drawer is configured to extend out of and retract into a housekeeping cart drawer frame of a housekeeping cart via a pair of pivot arms for deploying and storing a robotic vacuum while maintaining a fixed position of the battery-powered charging dock in the housekeeping cart drawer in order to allow the robotic vacuum to find and connect to the charging dock for charging batteries of the robotic vacuum while stored in the housekeeping cart drawer.

Embodiments of the housekeeping cart drawer and battery-powered charging dock for storing, charging, transporting, and deploying a robotic vacuum described in this section solve several existing and ongoing problems with robotic vacuum deployments for housekeeping and cleaning in hotels, inns, and other multi-room (guest or tenant) premises. Specifically, the housekeeping cart drawer is configured in a way that enables the battery-powered charging dock to be mobile and move with the housekeeping cart instead of fixed near a particular wall power outlet/socket. In some embodiments, the battery-powered charging dock is set flat on a floor of the housekeeping cart drawer. As a result, the housekeeping cart drawer is able to easily store/hold the robotic vacuum and the battery-powered charging dock, along with suitably large batteries that are connected to the battery-powered charging dock, thereby allowing the robotic vacuum and battery-powered charging dock to be moved with the housekeeping cart to multiple non-adjacent rooms over a long duration of time (i.e., charging batteries that capably provide power via cable to the battery-powered charging dock to charge batteries of the robotic vacuum throughout a full work day) without requiring a hotel maid or other housekeeping cleaning personnel to bend over, lift and carry, and find a wall outlet to plug in the charging dock.

Embodiments of the housekeeping cart drawer and battery-powered charging dock for storing, charging, transporting, and deploying a robotic vacuum described in this section differ from and improve upon currently existing options for housekeeping personnel of hotels, motels, inns, and other such places in need to routine cleaning of multiple rooms. In particular, some embodiments differ by providing a housekeeping cart drawer that can automatically extend out and be lowered to the ground and retract back into a housekeeping cart for deploying, storing, transporting, and charging a robotic vacuum. This obviates the need for housekeeping personnel to bend over, carry, move, etc., the robotic vacuum and charging dock which, under the existing scheme, must be set at a fixed location (such as nearby a wall power outlet/socket) to allow the robotic vacuum to return to the fixed location. This is not practical in a hotel or other location with multiple non-adjacent rooms since the robotic vacuum would eventually be unable to reach the charging port (if left in the fixed location) or would require relocation/movement of the charging port for each non-adjacent room being cleaned, which means the hotel maid/housekeeper must manually unplug, pick up, move, and plug-in the charging dock for each of several other non-adjacent rooms to be cleaned.

In addition, there is currently no method to make a robotic vacuum charging dock portable. Instead, the existing scheme requires the charging dock to be plugged in and unplugged for each new location or each room or suite of a hotel, inn, etc., or rather, for each non-adjacent room to be cleaned (i.e., a hotel suite or double room may be considered adjacent rooms). In contrast, the housekeeping cart drawer enables the robotic vacuum to return automatically to the battery-powered charging dock within the housekeeping cart drawer of the housekeeping cart. In this way, the hotel maid or housekeeping staff member does not need to bend down and the battery-powered charging dock does not need to be carried, plugged in, and unplugged each time it is used for cleaning multiple non-adjacent rooms.

By way of example, FIG. 1 conceptually illustrates a top perspective view of a movable housekeeping cart with a housekeeping cart drawer in some embodiments installed for storing, charging, transporting, and deploying a robotic vacuum. As shown in this figure, the movable housekeeping cart 50 stores a robotic vacuum 42 in a housekeeping cart drawer box 10 which includes and a kick plate 12 for extending the housekeeping cart drawer box 10 out to release the robotic vacuum 42. A section view taken along line 5-5 of the housekeeping cart drawer is described below by reference to FIG. 5.

Figure 2:
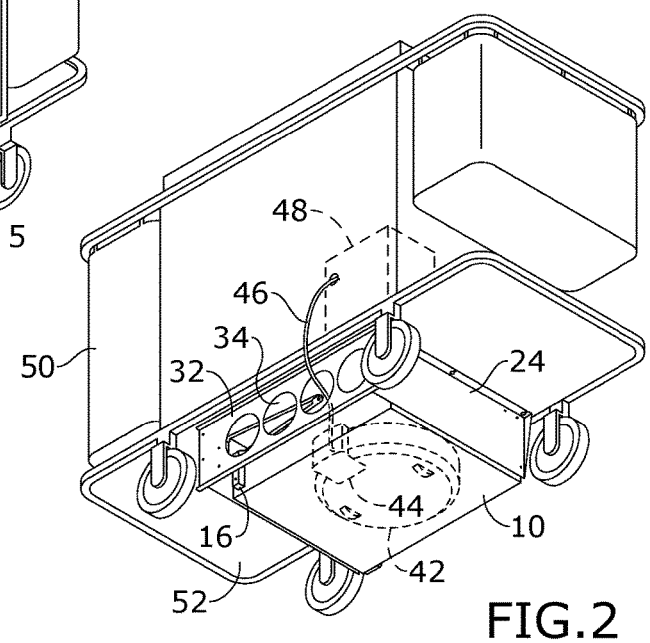
FIG. 2 conceptually illustrates a bottom perspective view of the movable housekeeping cart and the housekeeping cart drawer with a battery, a cable, and a battery-powered charging dock in some embodiments for storing and charging the robotic vacuum.

Now, turning to FIG. 2, a bottom perspective view of the movable housekeeping cart 50 and the housekeeping cart drawer box 10 is conceptually illustrated with a battery, a cable, and a battery-powered charging dock for storing and charging the robotic vacuum 42. Specifically, this figure shows the movable housekeeping cart 50 storing the robotic vacuum 42 in the housekeeping cart drawer box 10, along with a drawer mount 16, a first drawer frame side 24, a rear drawer frame panel 32, a plurality of cord slots 34, a charging dock 44, a cord 46, a battery 48, and a housekeeping cart bottom 52. As demonstrated in this figure, the robotic vacuum 42 is charged when connected to a charging dock 44, which receives power for charging batteries of the robotic vacuum 42 from the battery 48 over the cord 46. The cord 46 connects to the battery 48 and down through one of the cord slots 34 to the charging dock 44.

Figure 3:
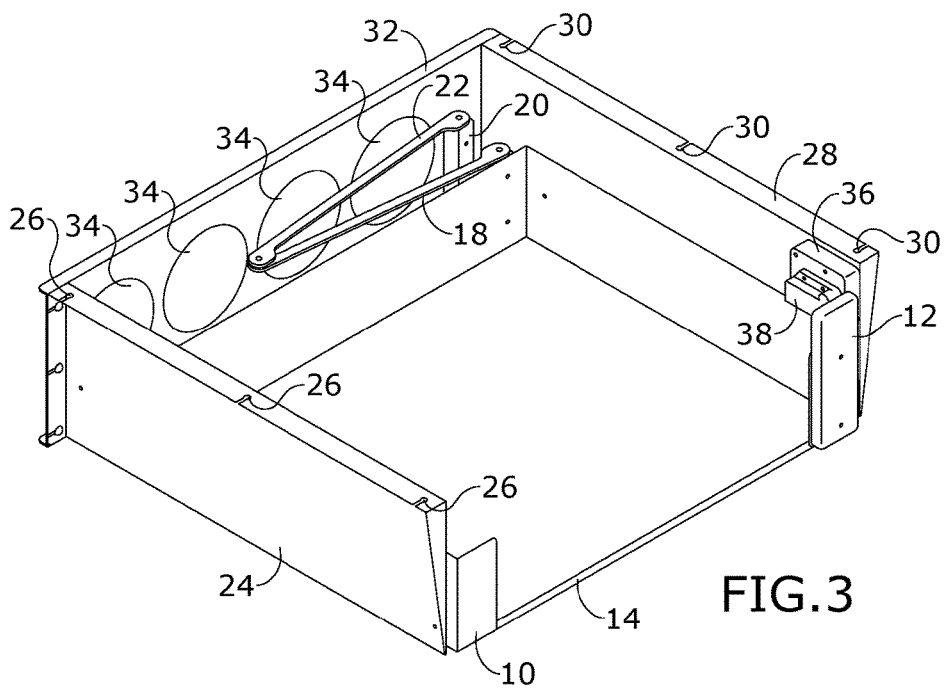
FIG. 3 conceptually illustrates a perspective view of a housekeeping cart drawer within a housekeeping cart drawer frame in some embodiments.

By way of example, FIG. 3 conceptually illustrates a perspective view of a housekeeping cart drawer box 10 within a housekeeping cart drawer frame. In addition to the housekeeping cart drawer box 10, several other items are shown in this figure, including the kick plate 12, a ramp lip 14, a drawer pivot arm 18, a frame arm mount 20, a frame pivot arm 22, the first drawer frame side 24, a plurality of first frame side mounting holes 26, a second drawer frame side 28, a plurality of second frame side mounting holes 30, the rear drawer frame panel 32, the plurality of cord slots 34, a latch mounting block 36, and a latch receiver 38. In some embodiments, the housekeeping cart drawer frame is made from the first drawer frame side 24, the second drawer frame side 28, and the rear drawer frame panel 32. In some embodiments, mounting screws secure the housekeeping cart drawer frame to the bottom of the housekeeping cart when screwed up through the plurality of first frame side mounting holes 26 and the plurality of second frame side mounting holes 30.

Figure 4:
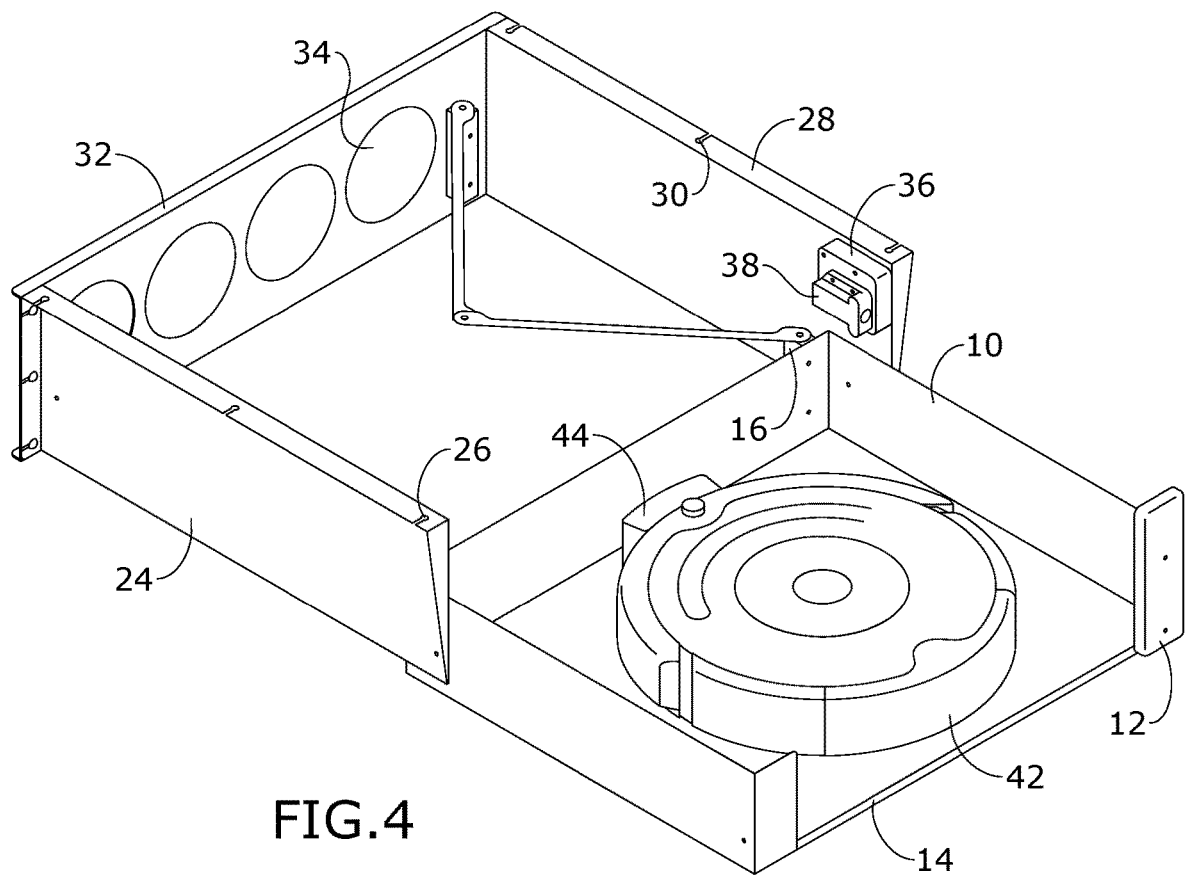
FIG. 4 conceptually illustrates extension of pivot arms that move a housekeeping cart drawer of some embodiments out of the housekeeping cart drawer frame to deploy the robotic vacuum.

Now turning to another view, FIG. 4 conceptually illustrates extension of pivot arms that move the housekeeping cart drawer box 10 out of the housekeeping cart drawer frame to put the robotic vacuum 42 in a position to be deployed. Several components are shown in this figure during extension of the housekeeping cart drawer box 10, including the kick plate 12, the ramp lip 14, a drawer arm mount 16, the first drawer frame side 24, the plurality of first frame side mounting holes 26, the second drawer frame side 28, the plurality of second frame side mounting holes 30, the rear drawer frame panel 32, the plurality of cord slots 34, the latch mounting block 36, the latch receiver 38, and the charging dock 44. As shown, the drawer pivot arm 18 and the frame pivot arm 22 are extended in a way that moves and lowers the housekeeping cart drawer box 10 out of the housekeeping cart drawer frame (out and away from the first drawer frame side 24, the second drawer frame side 28, and the rear drawer frame panel 32). From this lowered, extended position, the robotic vacuum 42 can disconnect from the charging dock 44 and deploy for cleaning the floor. Similarly, when the robotic vacuum 42 is finished with its floor cleaning it can return to the lowered, extended position of the housekeeping cart drawer box 10, moving up and over the ramp lip 14 and reconnecting to the charging dock 44 to charge its internal vacuum batteries.

As mentioned above by reference to FIG. 1, a different view is presented in FIG. 5, which conceptually illustrates a section view of the housekeeping cart drawer box 10 taken along line 5-5 of FIG. 1. In this figure, the first drawer frame side 24 is not shown to reveal several components in sectional view, including the housekeeping cart drawer box 10, the kick plate 12, the drawer arm mount 16, the drawer pivot arm 18, the frame arm mount 20, the frame pivot arm 22, the second drawer frame side 28, the rear drawer frame panel 32, a placement of the cord slots 34, the latch mounting block 36, the latch receiver 38, a latch post 40, the robotic vacuum 42, the charging dock 44, the housekeeping cart 50, a cart bottom 52, and a floor 54 surface on which to roll the housekeeping cart 50 and deploy the robotic vacuum 42. To release the housekeeping cart drawer box 10 from the housekeeping cart drawer frame, a human housekeeper would press the kick plate 12 by tapping it with a foot while standing in an upright position. By tapping the kick plate 12 with a foot, the latch post 40 would be released from within the latch receiver 38, and the drawer pivot arm 18 and the frame pivot arm 22 would spring outward along the angle to extend out and lower the housekeeping cart drawer box 10.

Full extension is shown by way of example in FIG. 6, which conceptually illustrates another section view of the housekeeping cart drawer box 10 at full extension and lowered to a room door threshold 56 for deployment of the robotic vacuum 42. As shown, the frame pivot arm 22 is attached to the frame arm mount 20, while the drawer pivot arm 18 is attached to the drawer arm mount 16, thereby linking the housekeeping cart drawer box 10 to the rear drawer frame panel 32 of the housekeeping cart drawer frame, which itself is fastened (via the plurality of first frame side mounting holes 26 and the plurality of second frame side mounting holes 30) to the cart bottom 52 of the housekeeping cart 50. Also, the frame pivot arm 22 and the drawer pivot arm 18 are shown in this figure as fully extended, such that the latch post 40 has been released from within the latch receiver 38 and the housekeeping cart drawer box 10 has moved out of the housekeeping cart drawer frame (out and away from the rear drawer frame panel 32) at an angle that lowers the housekeeping cart drawer box 10 to the room door threshold 56. Although the robotic vacuum 42 is shown in this figure to be connected to the charging dock 44, the extended and lowered position of the housekeeping cart drawer box 10 means the robotic vacuum 42 can be deployed by moving over the ramp lip 14 down to the floor 54. (Alternatively, the view in this figure can be illustrative a time after the robotic vacuum 42 returns to the charging dock 44 for charging and storage in the housekeeping cart drawer box 10.) An example of the robotic vacuum 42 disconnecting from the charging dock 44 and being deployed from the housekeeping cart drawer box 10 to the floor 54 for cleaning the room is described next, by reference to FIG. 7.

Figure 7:
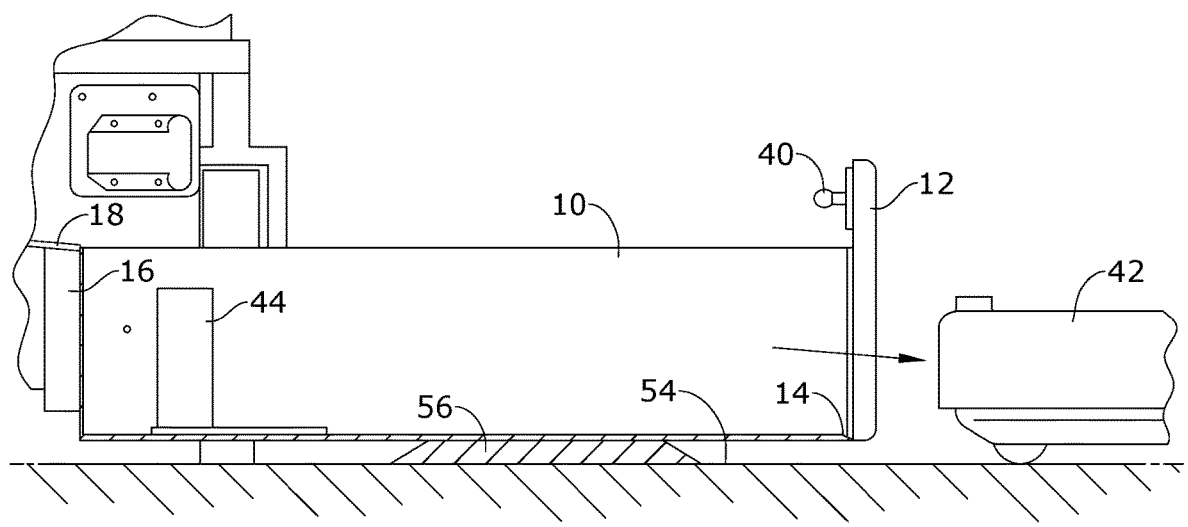
FIG. 7 conceptually illustrates a detail section view of the housekeeping cart drawer demonstrating the robotic vacuum being deployed out of the housekeeping cart drawer at the lowered threshold surface in some embodiments.

By way of example, FIG. 7 conceptually illustrates a detail section view of the housekeeping cart drawer box 10 demonstrating the robotic vacuum 42 being deployed out of the housekeeping cart drawer box 10 extended out from the housekeeping cart drawer frame and positioned at the lowered threshold surface 56.

To make the housekeeping cart drawer and battery-powered charging dock for storing, charging, transporting, and deploying a robotic vacuum of the present disclosure, the shelf of the housekeeping cart drawer frame can be made of injection molding or fabricated using plastic, metal or wood materials. Metal drawer slides are attached to the shelf of the housekeeping cart drawer frame at a particular angle to deploy the robotic vacuum at ground level. While the examples described by reference to FIGS. 1-7 demonstrated a single unnamed type of robotic vacuum 42 and charging dock 44, the housekeeping cart drawer box 10 is able to be configured for use with different types of robotic vacuums, home/charging stations (charging docks), and power banks (larger and/or longer-lasting batteries, different types of batteries, etc.) with suitable design modifications, such as those different design considerations employed for different types of housekeeping carts, noted above, so long as the housekeeping cart drawer box 10 is deployed at ground level (or near ground level with optional use of the ramp/ramp lip) and is retracted back into the housekeeping cart drawer frame for movement and transportation of the mobile housekeeping cart between separate, non-adjacent rooms. Specifically, the size of the housekeeping cart drawer box 10 can be altered to accept different size robots and the drop angle can be configured to drop the housekeeping cart drawer box 10 for the robotic vacuum deployment to the floor from carts of different heights.

II. Ramp-Equipped Non-Stationary Housekeeping Cart Drawer and Battery-Powered Charging Station Although the example described above pertain to a non-stationary housekeeping cart drawer and demonstrates how a robotic vacuum can be deployed from, stored in, and charged at a charging dock of the housekeeping cart drawer, in some embodiments, the housekeeping cart drawer includes additional components, including a ramp for deploying the robotic vacuum over large spatial gaps between the floor and the extended and lowered housekeeping cart drawer. Other additional components allow enhanced use of robotic vacuums in connection with the housekeeping cart drawing, including wireless communication components/devices.

Specifically, the housekeeping cart drawer in some embodiments includes the battery-powered charging dock and a ramp for deploying the robotic vacuum. In some embodiments, the ramp provides an alternative to extending the housekeeping cart drawer out of the housekeeping cart drawer frame for deploying the robotic vacuum. In some embodiments, the ramp is utilized to deploy the robotic vacuum when there is a gap between the threshold surface and the fully extended housekeeping cart drawer. In some other embodiments, the housekeeping cart drawer further includes a connection to a dust bin to enable the robotic vacuum to empty waste (dust and debris) from a recovery bin of the robotic vacuum into a larger dust bin inside the housekeeping cart. In some embodiments, the housekeeping cart drawer includes a wireless communication device to receive a signal from a corresponding wireless communication device of the robotic vacuum which signals when to prepare the housekeeping cart drawer for ingress of the robotic vacuum. In some embodiments, the housekeeping cart drawer prepares for ingress of the robotic vacuum by electronic extension of the pair of pivot arms and lowering of the housekeeping cart drawer to the threshold surface when the wireless communication device of the housekeeping cart drawer receives the signal from the corresponding wireless communication device of the robotic vacuum. In some embodiments, the housekeeping cart drawer additionally prepares for ingress of the robotic vacuum by electronic deployment of the ramp down to the threshold surface there is a gap between the housekeeping cart drawer and the threshold surface. In some embodiments, the wireless communication type used by the wireless communication device and the corresponding wireless communication device is Bluetooth.

III. Stationary Housekeeping Cart Drawer

While the descriptions of the housekeeping cart drawer above relate to deployments of a robotic vacuum when the housekeeping cart drawer is extended out and lowered to the floor. However, some embodiments of the housekeeping cart drawer are stationary. This means that some embodiments of the housekeeping cart drawer do not need to be extended out of the housekeeping cart drawer frame and lowered to the floor level for deployment of the robotic vacuum. Thus, the housekeeping cart drawer of some embodiments is a stationary housekeeping cart drawer box that is fixed in the housekeeping cart drawer frame with no pivot arms for extension and retraction of the stationary housekeeping cart drawer box. In some embodiments, the ramp of the stationary housekeeping cart drawer box is configured to allow for robotic vacuum ingress into the stationary housekeeping cart drawer box and robotic vacuum egress out of the stationary housekeeping cart drawer box. In some embodiments, the ramp of the stationary housekeeping cart drawer box is deployed and retracted by one of a foot pedal, a mechanical hand lever, and an electronic ramp. In some embodiments, the ramp includes a wireless communication device to receive a signal from a corresponding wireless communication device of the robotic vacuum which signals when to electronically retract the ramp. In some embodiments, the wireless communication type used by the wireless communication device and the corresponding wireless communication device is Bluetooth. In some embodiments, the stationary housekeeping cart drawer box includes an internal docking station with battery to recharge the robotic vacuum and a connection to a dust bin to enable the robotic vacuum to empty waste (dust and debris) from its recovery bin into a larger dust bin inside the housekeeping cart. In some embodiments, the larger dust bin inside the housekeeping cart can be cleaned by sliding a container out from the bottom of the stationary housekeeping cart drawer box.

Embodiments of the stationary housekeeping cart drawer box described in this section solves several problems noted above by way of a mobile cart that includes a deployable ramp and battery charger which enables a robotic vacuum to enter and exit a housekeeping cart for charging. This is a benefit to any person using the robotic vacuum because there is no need to bend down to deploy or pick up the robotic vacuum. Furthermore, the stationary housekeeping cart drawer box includes an internal charging station (charging dock) that is connected by power cord to a power source or power bank (battery or batteries—specifically, a larger battery may be used with the robotic vacuum to increase power, and thereby increase suction power of the robotic vacuum) to keep the robotic vacuum fully charged throughout the day, without ever connecting the charging dock to wall power outlets. Since the hotel maid, cleaning person, or other housekeeping person can start robotic vacuum deployment for cleaning each of several non-adjacent rooms, and the robotic vacuum automatically and programmatically returns to its beacon enabled charging dock for charging whenever needed, the hotel maid, cleaning person, or other housekeeping person never has to bend over to deploy or pick up the robotic vacuum. This has the positive effective of reducing or eliminating chronic pain that results from the repetitive stress of bending over/lifting or acute muscular injuries that may occur from bending over and over-extending muscles/ligaments.

Embodiments of the stationary housekeeping cart drawer box described in this section differ from and improve upon currently existing housekeeping robotic vacuum options. In particular, existing conventional robotic vacuums have no way to recharge throughout the day without human intervention, whereby a person must manually return the vacuum battery to a fixed charging station. Typically, this requires a person to bend over to pick up the robotic vacuum. The repetitive stress of bending over generally means that the person (who changes out the batteries for charging) prefers to limit the overall weight of the robotic vacuum. Thus, maids and other cleaning personnel are limited by how much weight and how often they can repeatably pick up items. The primary way to reduce weight is to reduce battery size but that makes the robotic vacuum less effective at providing suction. So, smaller and less powerful batteries are generally used. This effectuates a vicious cycle whereby the person is required to change out the batteries of the robotic vacuum more frequently for charging or has to take extra effort to clean up weakly cleaned carpet, etc., and thus, causes the person to end up bending over more often than would be the case if the batteries were bigger, heavier, and more powerful. Now imagine when the maid or cleaning personnel in a hotel has several non-adjacent rooms to clean. In this case, the robotic vacuum would have to be picked up and put down manually in each room.

In contrast, the stationary housekeeping cart drawer box of some embodiments includes a robotic vacuum ingress/egress ramp that eliminates the need for a maid or cleaning staff to repeatedly bend over to change out batteries since the robotic vacuum would be able to automatically enter and exit the housekeeping cart via the ingress/egress ramp. Furthermore, the stationary housekeeping cart drawer box of some embodiments enables the robotic vacuum to have increased power from larger batteries, and to be fully charged all day, thereby removing the need for the maid to bend down to deploy and pick up the robotic vacuum in each room (of the several separate, non-adjacent rooms to be cleaned). The stationary housekeeping cart drawer box provides additional benefits, such as charging the batteries inside of the stationary housekeeping cart drawer box at the charging dock which has a continual supply of power from the larger, more powerful batteries, and enabling automatic redeployment when charged so that the robotic vacuum can exit down the ingress/egress ramp for more cleaning upon reaching a threshold level of battery charge. In addition, more powerful batteries, which are typically larger and heavier, can be used, resulting in longer cleaning and/or more powerful suction by the robotic vacuum.

The stationary housekeeping cart drawer box of some embodiments may be comprised of the following elements:

1. Deployable and retractable ingress/egress ramp.
2. Internal charging station (charging dock) placed in the stationary housekeeping cart drawer box within the portable housekeeping cart.
3. Rechargeable battery within the portable housekeeping cart (can be placed on the stationary housekeeping cart drawer box or another platform of the housekeeping cart) and power cord between the rechargeable battery and the internal charging station (charging dock).
4. Connection to an internal dust bin.
5. Removable larger dust bin at bottom of housekeeping cart under the stationary housekeeping cart drawer box.
6. Indicator lights on the housekeeping cart that alert the user (hotel maid or other housekeeping personnel) when the robotic vacuum is inside the housekeeping cart being charged. Alternatively a different color light indicates the robotic vacuum is not inside the housekeeping cart and/or not being charged.

The various elements of the stationary housekeeping cart drawer box may be related in the following exemplary fashion. The deployable and retractable ingress/egress ramp is positioned along a bottom side of the mobile housekeeping cart. The ramp may be deployed and retracted using a mechanical foot pedal, hand lever, or by electronic means. By engaging the ramp, the robotic vacuum disconnects and departs from the internal charging station (charging dock) and moves toward the ramp. At the ramp, the robotic vacuum descends down the ramp to the floor of the room to be cleaned. The charging station (charging dock) is itself connected to the rechargeable battery via power cord. The stationary housekeeping cart drawer box is connected to the internal dust bin. The internal dust bin may be removed for cleaning/emptying. The charging station (charging dock) may charge the robotic vacuum using a pin to pin connection or mat charger or any charging means. An indicator light on the housekeeping cart alerts a user (hotel maid, housekeeper, or other staff) that the robotic vacuum is inside the stationary housekeeping cart drawer box of the housekeeping cart, is connected to the charging station (charging dock), and is in the process of being charged. In some embodiments, an alternative color is displayed by the indicator light to alert the user that the robotic vacuum is not inside the stationary housekeeping cart drawer box of the housekeeping cart and/or not being charged at the charging station (charging dock).

The stationary housekeeping cart drawer box of some embodiments generally works by the retractable ramp that is deployed from a typical hotel housekeeping cart by foot pedal, hand lever, or electronically which activates an electronic signal to a robotic vacuum inside the stationary housekeeping cart drawer box of the housekeeping cart to disengage from an internal charging station (charging dock) and descend down the ingress/egress ramp to the floor of a room in order to start vacuuming the room floor. When the robotic vacuum senses that the room is vacuumed, or after it completes a programmed cleaning routine, it returns back up the ingress/egress ramp and re-engages with the internal docking station (charging dock) for charging the onboard, installed batteries of the robotic vacuum. Once connected to the docking station (charging dock), the robotic vacuum begins recharging from a battery positioned inside the housekeeping cart. Concurrently, the dust bin opens and empties its contents into a larger dust bin in the bottom of the housekeeping cart. A set of indicator lights on the outside of the housekeeping cart alerts the end-user if the robotic vacuum is being charged and/or is outside of the housekeeping cart. The larger dust bin on the housekeeping cart may be emptied once full. A separate indicator light alerts the end-user when the dust bin on the housekeeping cart is full. The larger, rechargeable battery inside the housekeeping cart may be plugged into a standard wall outlet for recharging at a later time when the housekeeping cart is not in use. For example, the rechargeable battery can be charged over night by connection to a wall outlet. The ingress/egress ramp may be retracted once the robotic vacuum is back inside the housekeeping cart. The end-user may use a foot pedal, hand lever, or electronic connection to engage and retract the ingress/egress ramp.

To set up charging for the rechargeable batteries or power bank that provides power to the charging dock to charge the robotic vacuum, a person would plug the housekeeping cart into any standard wall outlet to charge the internal battery (batteries or power bank) on the housekeeping cart.

To use the stationary housekeeping cart drawer box and ingress/egress ramp, a person would first install the robotic vacuum inside the housekeeping cart and connect it to the docking station (charging dock). Then, if the internal battery (batteries, or power bank) is not charged or is low on charged power level, the person would plug the housekeeping cart into a standard power outlet to ensure a full charge of the internal battery (batteries, or power bank). Once the internal battery/batteries/power bank of the housekeeping cart is at full charged power level, the person may take the mobile housekeeping cart on the daily cleaning route. The person would position the housekeeping cart in front of an open door of a room to be cleaned. Then, once in position, the person would use their foot to depress the pedal, an electronic button, or kick plate, or use their hand to pull a hand lever to deploy the ramp from under the stationary housekeeping cart drawer box. In deploying the ramp, all actions of the person can be done in an upright standing position. Once the ramp deploys, the robotic vacuum exits the stationary housekeeping cart drawer box of the housekeeping cart and begins its work vacuuming the room(s). Upon completion, the robotic vacuum re-enters the stationary housekeeping cart drawer box of the housekeeping cart by climbing up the ramp, connecting to, and re-engaging with the charging station (charging dock). An indicator light will alert the person that it is safe to now close the ramp. Once inside the stationary housekeeping cart drawer box of the housekeeping cart the robotic vacuum will recharge itself and empty its dust bin into the larger collection bin at the bottom of the stationary housekeeping cart drawer box of the housekeeping cart. The larger dust bin may be emptied manually when it gets full. At the end of the day, the person returns the housekeeping cart back to a wall outlet to be plugged in, thereby charging the internal battery (batteries, or power bank).

Additionally, the stationary housekeeping cart drawer box can be adapted for use with other robotic/automated cleaning devices. For instance, the mobile housekeeping cart may include a robotic/automated small floor scrubber device ingress/egress ramp (fit to size of the particular floor scrubber or other cleaning device) and battery charging docking station may be used to charge small floor scrubbers or it may be used to deploy robotics for plumbing purposes where it is beneficial to deploy a robot at a location where a wall outlet may not be accessible.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A housekeeping cart drawer for storing, charging, transporting, and deploying a robotic vacuum, said housekeeping cart drawer comprising:

a housekeeping cart drawer frame that attaches to a bottom side of a housekeeping cart;

a housekeeping cart drawer box that fits in the housekeeping cart drawer frame and holds a robotic vacuum and a charging dock that is connected by a power cord to a battery that charges the robotic vacuum through the charging dock;

attached to a mounting shelf at an angle that allows the drawer to lay flat on the floor and to extend over a room door threshold;

a pair of pivot arms comprising a frame pivot arm and a box pivot arm; and a latch that secures the housekeeping cart drawer box within the housekeeping cart drawer frame during transportation of the housekeeping cart.

2. The housekeeping cart drawer of claim 1, wherein the housekeeping cart drawer frame includes a plurality of frame sides and a plurality of drawer mounting holes through which the frame sides attach to the bottom side of the housekeeping cart.

3. The housekeeping cart drawer of claim 1, wherein the latch comprises:

a latch mounting block;

a latch receiver disposed on the latch mounting block; and a latch post disposed on a back side of a kick plate, wherein the latch secures the housekeeping cart drawer box within the housekeeping cart drawer frame when the latch post is pushed from outside of the latch receiver into the latch receiver, wherein the latch releases the housekeeping cart drawer box from the housekeeping cart drawer frame when the latch post is pushed to a back of the latch receiver when the latch post is secured within the latch receiver.

4. The housekeeping cart drawer of claim 3, wherein the kick plate to which a first push force is applied to extend the housekeeping cart drawer box out from the housekeeping cart drawer frame and to which a second push force is applied to retract the housekeeping cart drawer box into the housekeeping cart drawer frame.

5. The housekeeping cart drawer of claim 4, wherein the pair of pivot arms that attach the housekeeping cart drawer box to the housekeeping cart drawer frame, wherein the pair of pivot arms extend out when the first push force is applied to the kick plate and collapse together when the second push force is applied to the kick plate.

6. The housekeeping cart drawer of claim 5, wherein the housekeeping cart drawer box is pushed out of the housekeeping cart drawer frame to full extension by extension of the pair of pivot arms when the first push force is applied to the kick plate.

7. The housekeeping cart drawer of claim 6, wherein the housekeeping cart drawer box extends out of the housekeeping cart drawer frame at an extension angle that allows the housekeeping cart drawer box to lay flat on a floor surface and to extend over the room door threshold.

8. The housekeeping cart drawer of claim 7, wherein the housekeeping cart drawer box retracts into the housekeeping cart drawer frame when the second push force is applied to the kick plate.

9. The housekeeping cart drawer of claim 8, wherein the first push force is applied to the kick plate by a human at a first level of intensity sufficient to release the latch, wherein the second push force is applied to the kick plate by the human at a second level of intensity sufficient to collapse the pair of pivot arms.

10. The housekeeping cart drawer of claim 1, wherein the frame pivot arm is mounted to the housekeeping cart drawer frame and the box pivot arm is mounted to the housekeeping cart drawer box.

\* \* \* \* \*